June 5, 1962  B. BARÉNYI  3,037,808
MOTOR VEHICLE BODY CONSTRUCTION
Filed Oct. 23, 1959
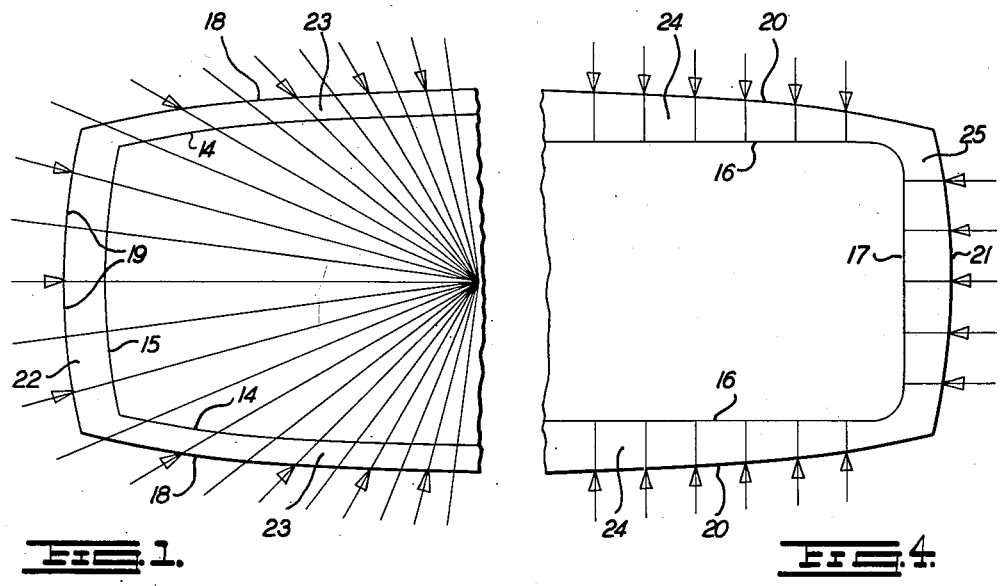
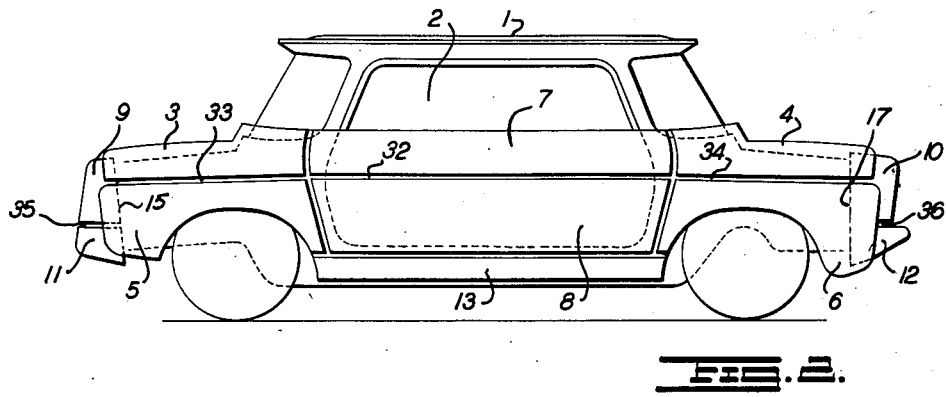
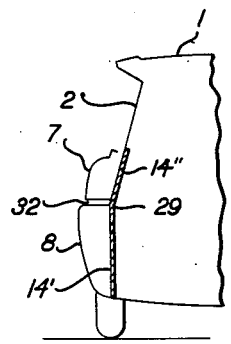 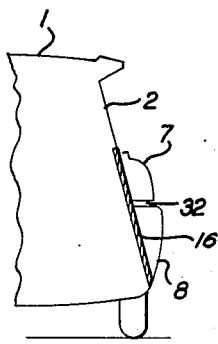
INVENTOR
BÉLA BARÉNYI
BY Dicke, Craig and Freudenberg
ATTORNEYS

United States Patent Office 3,037,808
Patented June 5, 1962

3,037,808
MOTOR VEHICLE BODY CONSTRUCTION
Béla Barényi, Stuttgart-Vaihingen, Germany, assignor to Daimler-Benz Aktiengesellschaft, Stuttgart-Unterturkheim, Germany
Filed Oct. 23, 1959, Ser. No. 848,361
Claims priority, application Germany Oct. 28, 1958
7 Claims. (Cl. 296—28)

The present invention relates to a motor vehicle and is concerned with a construction providing in such vehicles a greater protection to the frame, underframe, or that part of the vehicle forming a self-supporting body construction. The term underframework will be used hereinafter to designate that part of the vehicle which forms or is part of the frame, underframe, chassis or those parts of the vehicle body forming a self-supporting construction as contrasted to those vehicle body parts merely constituting outer vehicle body covering panels.

More particularly, the present invention is concerned with a construction in which the parts of the vehicle underframework of the motor vehicle which carry or support the same remain essentially undamaged in case of collisions or accidents. Furthermore, the present invention seeks to achieve a construction which enables a rapid and inexpensive repair, particularly by a relatively rapid interchange of the damaged outer vehicle body covering part or panel, and in which the upper vehicle body covering parts or panels are also protected against impacts from the outside thereof.

A further significant aspect of the present invention resides in the fact that with the same basic vehicle underframework, different types or models of motor vehicles may be manufactured without difficulty in accordance with the present invention which considerably distinguish themselves from each other as to shape, size and subdivision of the vehicle body outer covering thereof. As a result of the last-mentioned possibility to provide different types and models of motor vehicles with the same basic underframework, a problem which has been very acute heretofore in the motor industry is solved in a simple and effective manner.

Furthermore, a motor vehicle constructed in accordance with the teachings of the present invention may be readily changed, as will become more obvious from the following description, by very simple means into different models if, for example, a model change is contemplated in the manufacture thereof. The savings derived therefrom in connection with manufacturing and assembling installations as well as with labors in planning and developing the different models are thereby considerable by the use of the present invention.

The present invention is essentially characterized by the fact that the outer contours of the vehicle underframework are recessed or set back, especially in front, on the sides and in the rear of the vehicle, with respect to the outer contours of the outer vehicle body covering parts or panels so that buffer or bumper spaces are formed between the outer vehicle body covering parts and the contour of the vehicle underframework, and so that preferably all of the outer vehicle body covering parts or panels become readily interchangeable thereby. The outer contours of the outer vehicle body covering parts or panels and the contours of the vehicle underframework may thereby be disposed essentially parallel to each other, or, in the alternative, the contours of the vehicle underframework may extend rectilinearly, for example, with curved or arched outer contours of the outer vehicle body covering parts or panels.

According to a further feature of the present invention, the vehicle underframework may be defined or delimited by essentially planar surfaces. The position of the last-mentioned surfaces may thereby be either vertical and/or inclined. Furthermore, it is appropriate that the corresponding outer surfaces of the outer vehicle body covering parts or panels are constructed individually or altogether vertically and/or at an inclination. Especially, the vehicle front and rear body covering parts or panels may be inclined outwardly or inwardly of the vehicle whereas the corresponding boundary walls of the vehicle underframework are inclined inwardly or outwardly in the corresponding direction or in the opposite direction.

It is particularly appropriate in connection with the solution of the problem posed by the present invention if the bumper or buffer depth and therewith the distances of the vehicle underframework contours from the forwardly and/or rearwardly disposed contours of the outer vehicle body covering parts or panels are greater than the corresponding distance within the lateral regions of the vehicle. The buffer or bumper depths may thereby decrease constantly in the vehicle longitudinal direction from the transverse center plane of the vehicle toward the corners of the vehicle. Furthermore, the lateral buffer or bumper spaces may intersect with the front and rear buffer or bumper spaces in such a manner and the corners of the vehicle underframework and of the outer vehicle body covering parts may be so constructed that a relatively large buffer or bumper depth is formed in each of the corners of the vehicle.

According to a further feature of the present invention, preferably all of the outer vehicle body covering parts are subdivided into individual panels at approximately half the height of the vehicle, and particularly the lower parts of the outer vehicle body covering may be constructed as readily interchangeable buffer or bumper parts. The costs connected with repairs are relatively low as a result of such an arrangement and construction of the outer vehicle body parts. Furthermore, it is possible to create exclusively by the interchange or substitution of these lower bumper parts a completely new vehicle type or a completely new vehicle model.

According to still another feature of the present invention, the upper and lower parts of the outer vehicle body covering may be separated from each other by a gap or joint extending essentially in the horizontal direction.

It is particularly appropriate if preferably all of the lower outer vehicle body covering parts project outwardly with respect to and beyond the upper vehicle body covering parts in order that the upper vehicle body covering parts are protected against external impacts and forces by the lower outer vehicle body covering parts which, as mentioned hereinabove, project therebeyond and thereby absorb initially these impacts.

According to a further development of the aforementioned inventive concept of the subdivision of the outer vehicle body covering into upper and lower body parts, the front, rear and lateral body walls of the doors may consist each of an upper and of a lower part, the fenders are mounted separate from the engine or luggage space hood or lid in a readily detachable manner and all of the lower parts of the outer vehicle body front and rear panels, of the doors and of the fenders are constructed so as to project with respect to the upper parts and are secured so as to be readily detachable.

Accordingly, it is an object of the present invention to provide a motor vehicle construction which is simple in nature, yet provides an effective protection for the frame or those parts of the vehicle body, particularly for those parts constituting the weight-supporting members thereof.

Another object of the present invention is the provision of a motor vehicle construction which lends itself readily to the production of different types and models of a vehicle which utilizes the same basic vehicle underframework such as the frame, underframe, or self-supporting vehicle body.

Still another object of the present invention resides in the provision of a motor vehicle body construction which may be readily mounted on the underframework of the vehicle, which facilitates repair of the damaged parts and which is so arranged that certain bumper-like parts protect the remainder of the body against damage caused by external impacts in case of collision or the like.

Still another object of the present invention resides in the provision of a motor vehicle construction in which the exposed body parts may be readily interchanged in case of repair.

These and other objects, features and advantages of the present invention will become more obvious from the following description when taken in connection with the accompanying drawing which shows, for purposes of illustration only, several embodiments in accordance with the present invention and wherein:

FIGURE 1 is a schematic plan view of one half of a motor vehicle to be thought of as a horizontal cross-sectional view through a first embodiment of a passenger-type motor vehicle in accordance with the present invention taken slightly below half the height of the vehicle, FIGURE 2 is a side elevational view of a passenger motor vehicle in accordance with the present invention, FIGURE 3 is a schematic transverse cross-sectional view through one half of a motor vehicle in accordance with the present invention, the cross-section being taken essentially in the center of the vehicle perpendicularly to the longitudinal direction of the vehicle, FIGURE 4 is a schematic plan view of one half of a second embodiment of a motor vehicle construction in accordance with the present invention, similar to the view of FIGURE 1, and FIGURE 5 is a schematic transverse cross-sectional view through one half of another embodiment of a motor vehicle construction in accordance with the present invention similar to FIGURE 3.

While FIGURES 1, 3, 4 and 5 only show one half of the side of a motor vehicle, it is understood that the other half is of essentially symmetrical construction or mirror-image-like construction from the arrangement shown in these figures.

Referring now to the drawing wherein like reference numerals are used throughout the various views to designate corresponding parts, the different embodiments illustrated therein show a passenger motor vehicle constructed in accordance with the present invention which is completely symmetrical with respect to a center transverse plane. The motor vehicle according to the present invention is thereby provided with an essentially flat roof 1 and with a sliding door 2 at least on one side thereof. However, ordinarily, the motor vehicle in accordance with the present invention is preferably provided with slidable doors 2 on both sides of the vehicle, even though only one such door is illustrated in each of FIGURES 2, 3 and 5. The outer vehicle body covering of this vehicle essentially consists of the front and rear cover hoods or lids 3 and 4, of the fenders 5 and 6 (FIGURE 2) whereby the opposite side of the vehicle of FIGURE 2 is provided with mirror-image-like fenders, and of the two outer vehicle body parts 7 and 8 of each slidable door 2. The front and rear end walls of the vehicle in accordance with the present invention consist essentially of the upper parts 9 and 10 and of the lower parts 11 and 12, respectively. The vehicle underframework, particularly the lateral longitudinal bearer member of the frame or vehicle underframework is protected below the door by the threshold cover 13 thereof (FIGURE 2).

FIGURES 3 and 5 illustrate the outer vehicle body parts 7 and 8 of a slidable door 2 in essentially vertical transverse cross-sectional view.

Some of the most significant features of the present invention may be readily seen from FIGURES 1 and 4. The arrows shown in both of these views indicate the impacts or forces that may possibly be expected to impinge or act normally on the vehicle from the outside thereof. As may be readily seen in FIGURES 1 and 4, the outer contours 14 and 15 (FIGURE 1) and the outer contours 16 and 17 (FIGURE 4) representing the outer contours of the vehicle underframework such as the frame, underframe or those parts of a self-supporting vehicle body carrying the weight, especially in front, in the rear and along the sides of the vehicle, are set back with respect to the outer contours 18 and 19 (FIGURE 1) and the outer contours 20 and 21 (FIGURE 4) representing the outer contours of the outer vehicle body parts or panels so that between the outer vehicle body parts and the contours indicated by lines 18 and 19 (FIGURE 1) and by lines 20 and 21 (FIGURE 4) of the vehicle underframework, buffer or bumper spaces 22 and 23 (FIGURE 1) and buffer or bumper spaces 24 and 25 (FIGURE 4) are effectively formed.

In the embodiment of FIGURE 1, the outer contours 18 and 19 of the outer vehicle body parts and the contours 14 and 15 of the vehicle underframework are disposed essentially parallel to each other.

In the embodiment of FIGURE 4, in contrast thereto, the outer contours 20 and 21 of the vehicle outer body parts are curved or arched whereas the contours 16 and 17 of the vehicle underframework extend essentially rectilinearly.

The manufacture of the vehicle underframework illustrated in FIGURE 4 and the mounting and assembling of the vehicle body parts or panels is particularly simple in this embodiment because, within the region of the connection between the vehicle underframework and the vehicle body outer covering parts, essentially straight or rectilinear surfaces or structural parts abut against each other essentially in one direction. In order to further enhance the advantage which may be derived by this construction, the boundary surfaces of the underframework may also be constructed in a plane manner, as illustrated in FIGURES 3 and 5.

FIGURES 3 and 5 represent two embodiments illustrating a further feature in accordance with the present invention concerning the lateral construction of a vehicle, especially the lateral boundary walls of the vehicle underframework disposed in the vehicle longitudinal direction. In FIGURE 3, the lateral boundary surface of the vehicle underframework is subdivided into two partial plane surfaces 14' and 14" corresponding to contour 14 of FIGURE 1 whereby both partial surfaces 14' and 14" may constitute a common structural part, as more fully disclosed in my co-pending application, Serial No. 845,058, filed October 6, 1959, and entitled Motor Vehicle Door Construction. In FIGURE 5, the lateral boundary surface of the vehicle underframework in constructed as a plane surface 16 corresponding to contour 16 of FIGURE 4 and inclined with respect to the vertical. However, it is also understood that two structural parts 14' and 14" may be provided for the plane surface 16 of FIGURE 5 which are rigidly connected with each other in any suitable manner, for example, by bolting, welding, seam-welding, spot-welding or the like, along line 29, as also disclosed in the aforementioned application.

In a similar manner, the outer surfaces of the vehicle body parts may be constructed so as to be vertical and/or inclined with respect to the vertical.

In connection with the passenger motor vehicle illustrated in FIGURE 2, different possibilities of the inclination of the outer vehicle body parts and of the relationship of this inclination to the inclination of the corresponding boundary surfaces of the underframework are shown as illustrative examples. For example, in the left end portion of the passenger motor vehicle of FIGURE 2, two vehicle body covering parts 9 and 11 are used to cover the end surface 15 of the vehicle underframework. The outer contour of the vehicle body parts 9 and 11, as illustrated in FIGURE 2, is essentially vertical, however, slightly inclined with respect to the vertical upwardly toward the right as viewed in FIGURE 2. In contrast thereto, the corresponding end surface 15 corresponding to contour 15 of FIGURE 1 of the vehicle underframework is inclined in the opposite direction upwardly toward the left. There is achieved by such an arrangement that the outer vehicle body covering part 11 projects with respect to the outer vehicle body covering part 9 and, therefore, is initially deformed in case of collision and eventually absorbs any deformation work which suffices in order to keep the upper vehicle body part 9 essentially free of any damages.

An opposite relationship exists in the right end portion of the vehicle illustrated in FIGURE 2, in which the contours of the vehicle underframework end wall 17 corresponding to contour 17 of FIGURE 4 and of the outer vehicle body covering parts 10 and 12 adjoining this end wall 17 is illustrated. As in the left end part, the outer vehicle body covering part 12 again projects in the vehicle longitudinal direction beyond the upper vehicle body part 10 within the lower area of the end wall 17. The same is also true for the vehicle body parts 7 and 8 of the door, as clearly illustrated in FIGURES 3 and 5. With both embodiments of FIGURES 3 and 5, the lower vehicle body parts or panels 8 project beyond the upper vehicle body parts or panels 7.

In case of collision, the lower vehicle body part therefore always is initially damaged and usually is the only part that is damaged in that event. The lower vehicle body parts are therefore constructed as bumper-type parts. The lower buffer or bumper-like parts may consist of a relatively inexpensive material and, above all, may be secured at the vehicle underframework in a very simple manner. As a result thereof, repairs and labors connected with the exchange of parts are greatly facilitated. Possibly such repairs and exchanges of parts may be undertaken by the owner of the vehicle himself.

It is also understood, of course, that the two end portions of the vehicle illustrated may be constructed in an identical manner as to the contours of the upper and lower body parts and of the end wall of the underframework so that the arrangement of either the parts 9, 11, 15 or 10, 12, 17 may be used for both ends of the vehicle.

It may readily be seen from the schematic representation of the contours of the outer vehicle body parts, on the one hand, and of the vehicle underframework, on the other, as shown in FIGURES 1 and 4, that the bumper or buffer depths of the buffer or cushioning spaces 22 (FIGURE 1) and of the buffer spaces or cushioning spaces 25 (FIGURE 4), i.e., the distance between the contours 15 (FIGURE 1) and 17 (FIGURE 4) of the vehicle underframework from the front and rear end contours 19 (FIGURE 1) and 21 (FIGURE 4) of the outer vehicle body covering parts, respectively, are larger than the corresponding distances in the lateral regions of the vehicle. Such an arrangement takes in consideration the fact that the front and rear end of the vehicle are subjected to the most frequent and largest damages. By reason of the fact that larger bumper depths are provided within the last-mentioned areas of the vehicle, relatively larger impacts and forces may thereby be absorbed by the bumper parts disposed in front and rear of the vehicle and may be transformed into deformation work of these parts without thereby damaging the vehicle underframework.

In FIGURE 4, the depth of the buffer or bumper spaces 24 decreases continuously toward the corners in the vehicle longitudinal direction from the center transverse cross-sectional plane of the vehicle. However, a relatively large bumper depth is nonetheless formed in the corners of the vehicle of this embodiment by reason of the fact that the lateral bumper spaces 24 combine thereat with the front and rear end bumper spaces 25.

As clearly visible from FIGURES 2, 3 and 5, all of the vehicle outer body covering parts illustrated in the embodiments shown therein are subdivided approximately at half the height of the vehicle into lower and upper outer body covering parts or panels whereby, as mentioned hereinabove, the lower vehicle body parts are constructed as readily interchangeable bumper or buffer parts. The individual outer body covering parts are thereby separated by a gap. These gaps or joints are designated within the area of the slidable doors 2 by reference numeral 32. The corresponding joints or gaps are designated within the area of the engine and luggage space hood and fender adjoining the slidable door by reference numerals 33 and 34. The joints at the front and rear end of the vehicle which are formed by the subdivided body parts 9 and 11 and by the subdivided body parts 10 and 12 are designated by reference numerals 35 and 36.

From the particular subdivision of the entire outer vehicle body covering of the vehicle into individual outer vehicle body parts, as well as from the use of the aforementioned joints, results also the possibility, in addition to a simplified manufacture of the entire vehicle, to construct without great expenditure a completely different model or a completely different vehicle type with the same basic vehicle underframework. The different models are achieved by change in the form, size and subdivision of the individual vehicle body parts and by a different location of the joints.

According to FIGURE 2, the joints 32, 33 and 34 are disposed in a horizontal plane. By the use of such an arrangement of the joints, a good aesthetic appearance of the entire vehicle is achieved.

As illustrated in FIGURE 2, the completely symmetrical vehicle shown therein is provided with front and rear outer vehicle body parts each consisting of a hood 3 or 4 and of two fenders 5 and 6, of which only one fender each is shown. It is understood, however, that within the scope of the overall inventive concept of a vehicle of the present invention, the fender 5, for example, is a part made by itself which is not connected with the hood 3 but, instead, is directly secured to the vehicle underframework. The same is also true for fender 6. Consequently, the fenders may also be readily interchanged. Exactly as the body part 8 of the slidable door, the fenders 5 and 6 are each constructed as projecting buffer or bumper parts.

The particular construction of the projecting parts of the door subdivided into two sections which construction may also be used, insofar as applicable, with the remaining body parts of the vehicle may be made in any suitable manner, for example, according to the teachings of any one of the embodiments of my co-pending application Serial No. 845,058, filed October 6, 1959, and entitled Motor Vehicle Door Construction.

From the foregoing, it becomes quite obvious that the present invention is concerned with the task of providing a greater protection for the vehicle underframework such as the frame, subframe, and those parts of a self-supporting vehicle body which carry the weight, and more particularly is concerned with the provision of an arrangement in which the supporting parts of the vehicle underframework remain essentially undamaged in case of collision or the like. Furthermore, as is quite clear from the foregoing, the present invention also aims at relatively rapid and inexpensive repair possibilities, especially by a rapid interchange of the damaged vehicle parts and a vehicle construction in which the upper vehicle body parts are also protected against impacts from the outside thereof.

Up to the present, it was conventional in motor vehicles to provide bumper rails or the like for purposes of protecting the same against damage in case of collisions, which bumpers were usually made of relatively sturdy and resistant material, such as special alloy steel or the like, and which were usually also rigidly connected with the supporting part of the vehicle underframework. While these prior art arrangements achieved an essentially complete elimination of damages to the vehicle in case of relatively minor collisions, these prior art arrangements also entail the disadvantage that, in case of relatively serious collisions, the forces resulting therefrom are transmitted to the full extent thereof to the supporting parts of the motor vehicle, to which the bumpers are secured, and therefore result in heavy damage to these supporting parts. However, as is also known, damages at the supporting parts of the motor vehicle underframework render the same, for the most part, unusable, and such damages can be removed only by very expensive repairs.

All of these disadvantages are avoided by the present invention by offsetting the outer contours of the vehicle underframework with respect to the outer contours of the vehicle outer body covering parts in the direction of the interior of the vehicle, so that buffer spaces are formed between the outer vehicle body covering parts and the contour of the vehicle underframework, whereby, preferably, all of the outer vehicle body covering parts are so arranged and constructed as to be readily interchangeable.

By the use of a construction of a motor vehicle in accordance with the present invention, it is possible to achieve, in case of a collision, a conversion of the impact energy in deforming work, whereby the underframework no longer has to absorb substantial forces. Consequently, damages to the underframework are effectively eliminated as a general rule.

The term "buffer or bumper spaces" within the meaning of the present invention thereby designates empty spaces which are enclosed between the outer contours of the outer vehicle body covering parts and the outer contours of the vehicle underframework, and which enable an unimpaired and unobstructed deformation of the outer vehicle body parts in case of collision. The term "depth" as referred to in connection with the buffer spaces thereby indicates the space or dimension remaining between the contours of the vehicle outer body parts and the outer contours of the vehicle underframework which is purposely left so as to make possible the deformation of the outer body covering parts.

Since the vehicle outer body covering parts, such as the parts 11, 12, 5, 6 and 8, are normally expected to be deformed in case of collision, much in the same manner as bumpers are intended to absorb the forces in case of collision in the conventional vehicles, it is appropriate in accordance with the present invention to manufacture these vehicle outer body covering parts also of relatively inexpensive material, in order to keep the repair costs as low as possible. Furthermore, it is essential also in accordance with the present invention that these buffer-like outer vehicle covering parts are so secured at the vehicle underframework as to enable a rapid and easy exchange of these parts. This is achieved in accordance with the present invention by the fact that the underframework of the motor vehicle is delimited by planar surfaces, thereby facilitating such securing, such planar surfaces being shown also in FIGURES 2, 3 and 5. The rapid interchange, for example, of the vehicle end body parts 9, 11 and 10, 12 to and from the vehicle underframework is thereby greatly facilitated by reason of the fact that the laterally bent end portions thereof extend in the longitudinal direction of the vehicle into the space between the vehicle body parts 3, 5 and 4, 6 and are detachably secured at the ends thereof in any suitable manner, for instance, by means of flanges or the like at the vehicle underframework.

While I have shown and described several embodiments in accordance with the present invention, it is understood that the basic inventive concept is not limited thereto, but is susceptible of many changes and modifications within the spirit and scope of the present invention.

I therefore do not wish to be limited to the particular details shown and described herein, but intend to cover such changes and modifications as are encompassed by the scope of the appended claims.

I claim:

1. A motor vehicle, especially a passenger motor vehicle, comprising relatively rigid underframework means for supporting thereon the outer vehicle body covering, and a plurality of readily removable upper and lower outer body covering panels separated from each other by gap means, said underframework means being set back with respect to the outer body covering panels with the front, rear and lateral regions of the vehicle so that bumper spaces are formed between said underframework means and said vehicle body covering panels, said lower covering panels projecting outwardly beyond said upper covering panels so as to protect said upper covering panels, the vehicle body covering panels disposed outwardly of said underframework means being secured to said underframework means so as to be readily interchangeable, the bumper spaces within said front and rear regions extending essentially across the entire transverse width of said vehicle, at least the major portion of said underframework means on each side of the vehicle defining abutment surfaces for the securement thereto of the body covering panels so as to form said bumper spaces on each side of the vehicle and being essentially uniplanar and extending a substantial length of the vehicle substantially parallel to the longitudinal axis of the vehicle.

2. A motor vehicle according to claim 1, wherein the bumper spaces on the sides of the vehicle intersect with the front and rear bumper spaces in such a manner that the corners of the vehicle underframework means and of the vehicle body covering panels are so constructed that a relatively large bumper depth is formed in each of the corners of the vehicle.

3. A motor vehicle comprising underframework means for supporting thereon the outer vehicle body covering, and a plurality of upper and lower outer body covering parts, said lower outer body covering parts protruding outwardly beyond said upper outer body covering parts and being separated therefrom by gap means, said underframework means being set back at least with respect to the outer body covering parts within the front, rear and lateral regions of the vehicle so that bumper spaces are formed between said underframework means and said outer body covering parts, said bumper spaces extending around essentially the entire circumference of said underframework means, said underframework means defining essentially rectilinear abutment surfaces for said outer body covering parts at least when viewed in vertical cross section, said abutment surfaces in the lateral regions of the vehicle extending essentially parallel to the longitudinal axis of the vehicle, and said abutment surfaces in the front and rear regions of the vehicle extending essentially parallel to the transverse axis of the vehicle.

4. A motor vehicle, especially a passenger motor vehicle, comprising underframework means for supporting thereon the outer vehicle body covering, and a plurality of vehicle outer body covering panels, said underframework means being set back at least with respect to some of said outer vehicle body covering panels within the front, rear and lateral regions of the vehicle so that bumper spaces are formed between said underframework means and said vehicle body covering panels, the vehicle body covering panels disposed outwardly of said underframework means being secured to said underframework means so as to be readily interchangeable, the bumper spaces within said lateral regions decreasing in depth towards said front and rear regions, the bumper spaces within said front and rear regions extending essentially across the entire transverse width of said vehicle into communication with the bumper spaces within said lateral regions so that a relatively large bumper depth is formed at each of the corners of the vehicle, at least a substantial portion of said underframework means on each side of the vehicle being essentially uniplanar and extending substantially parallel to the longitudinal axis of the vehicle and defining abutment surfaces for the securement thereto of the vehicle body covering panels on each side of the vehicle.

5. A motor vehicle comprising underframework means for supporting thereon the outer vehicle body covering, and a plurality of readily removable vehicle outer body covering parts, said underframework means being set back at least with respect to some of said vehicle outer body covering parts within the front, rear and lateral regions of the vehicle so that bumper spaces are formed between said underframework means and said vehicle body covering parts, said bumper spaces extending around essentially the entire circumference of said underframework means, said underframework means defining essentially rectilinear abutment surfaces for said outer body covering parts when viewed in vertical cross section to enable said outer body covering parts to be slid into proper position thereupon, and to be readily removable and replaceable by other outer body covering parts, said abutment surfaces being essentially parallel to the outer contours of respective parts of said outer body covering.

6. A motor vehicle according to claim 5, wherein all of the outer vehicle body covering panels are subdivided essentially at half the height of the vehicle into upper and lower sections and wherein the lower panel sections are constructed as readily interchangeable bumper parts.

7. A motor vehicle according to claim 6, wherein the front walls, the rear walls and the doors of the outer vehicle body covering consist of an upper and a lower part, wherein the panels constituting the fenders are mounted readily interchangeable on said underframework, means separate from the panels constituting the engine compartment and luggage compartment lids and wherein all of the lower parts of the outer vehicle body front and rear wall panels, of the doors and fender panels are secured at said underframework, means so as to be readily interchangeable and project beyond the upper parts.

References Cited in the file of this patent

UNITED STATES PATENTS

| | | |
|---|---|---|
| 2,269,451 | Ford | Jan. 13, 1942 |
| 2,474,992 | Stephenson et al. | July 5, 1949 |
| 2,797,953 | Barenyi | July 2, 1957 |
| 2,886,373 | Barenyi | May 12, 1959 |
| 2,916,324 | Graham | Dec. 8, 1959 |

FOREIGN PATENTS

| | | |
|---|---|---|
| 801,909 | Great Britain | Sept. 24, 1958 |

(Corresponding U.S. 2,988,397, June 13, 1961)